United States Patent
Sutter et al.

(10) Patent No.: US 6,882,122 B1
(45) Date of Patent: Apr. 19, 2005

(54) ELECTRONICALLY SWITCHABLE MOTOR WITH OVERLOAD PROTECTION

(75) Inventors: Joerg Sutter, Gaggenau (DE); Wolfgang Schwenk, Oberkirch-Tiergarten (DE); Claude Berling, Drusenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,270

(22) PCT Filed: Sep. 6, 2000

(86) PCT No.: PCT/DE00/03055

§ 371 (c)(1),
(2), (4) Date: Jul. 17, 2002

(87) PCT Pub. No.: WO01/20768

PCT Pub. Date: Mar. 22, 2001

(30) Foreign Application Priority Data

Sep. 15, 1999 (DE) .......................... 199 44 194

(51) Int. Cl.[7] .................................. H02P 6/08
(52) U.S. Cl. .................. 318/254; 318/434; 388/903
(58) Field of Search ................ 318/138, 254, 318/434, 439, 459, 500; 388/903, 909, 928.1

(56) References Cited

U.S. PATENT DOCUMENTS

| | | | | | |
|---|---|---|---|---|---|
| 4,544,868 | A | * | 10/1985 | Murty | 318/254 |
| 5,170,106 | A | * | 12/1992 | Ogasawara | 318/434 |
| 5,204,604 | A | * | 4/1993 | Radum | 318/701 |
| 5,519,301 | A | * | 5/1996 | Yoshida et al. | 318/811 |

FOREIGN PATENT DOCUMENTS

| | | |
|---|---|---|
| DE | 44 44 810 | 6/1996 |
| DE | 44 44 811 | 6/1996 |
| EP | 0 413 942 | 2/1991 |

* cited by examiner

*Primary Examiner*—Bentsu Ro
(74) *Attorney, Agent, or Firm*—Kenyon & Kenyon

(57) ABSTRACT

Electronically commutable motor whose output stages are controllable by an electronic control unit, using PWM control signals, and are feedable from a supply voltage source. A limitation to a maximum load with overload protection is achieved, at least upon exceeding the nominal voltage of the motor, by reducing the pulse width of the PWM control signals for the output stages to a width that prevents overloading of the motor and electronic components by limiting the motor output, as a function of the magnitude of the supply voltage and the specified setpoint for the PWM control signals.

15 Claims, 3 Drawing Sheets

ELECTRONICALLY SWITCHABLE MOTOR WITH OVERLOAD PROTECTION

FIELD OF THE INVENTION

The present invention relates to an electronically commutable motor whose output stages are controllable by an electronic control unit, using PWM signals, and are feedable from a supply voltage source.

BACKGROUND INFORMATION

In motors of this type, the electronic control unit supplies power to the motor output stages, which ordinarily include semiconductor switches and windings. The control unit is usually designed for bidirectional operating conditions. If the motor drives a fan, for example, the current rises in proportion to the squared motor speed, while the motor speed rises in linear proportion to the supply voltage. If fans of this type are used in a motor vehicle and fed from the vehicle battery, the motors are designed for a nominal voltage of 13 V, for example, but must operate dependably at a voltage of up to 16V, for example. The fan must provide the necessary air capacity at the nominal voltage. The higher air capacity available at higher battery voltages is therefore superfluous. However, these stipulations mean that the motor and the electronic components must be designed for higher performance ratings around 16V.

SUMMARY OF THE INVENTION

An object of the present invention is to provide an electronically commutable motor that is designed so that its electronic components are limited to the load specified by the nominal voltage and are protected against overloading even when the supply voltage exceeds the nominal voltage.

This object is achieved according to the present invention by enabling the pulse width of the PWM control signals for the output stages to be reduced, at least upon exceeding the motor nominal voltage, to a width that prevents overloading of the motor and electronic components by limiting the motor output, as a function of the magnitude of the supply voltage and the specified setpoint for the PWM control signals.

By influencing the PWM control signals for the motor output stages in this manner, the maximum load is defined by the nominal voltage and the maximum setpoint and cannot increase any further even with high supply voltages. The motor and its electronic components therefore need to be designed only for this load and are protected against overloads.

A design of this type also enables the pulse width to be reduced in such a way that the pulse width is reduced in linear or nonlinear proportion to the rising supply voltage; however, it is also possible for the pulse width to decrease at an increasing rate with an increasing specified setpoint and rising supply voltage. This latter instance advantageously makes use of the fact that a smaller specified setpoint reduces the load on the motor and its components, due to lower currents.

According to one embodiment, the pulse width reduction may be incorporated into the control unit by assigning the control unit a correction unit that forwards, to the motor output stages, the PWM control signals for the motor output stages determined according to the specified setpoint, either unchanged or as reduced PWM control signals, as a function of the magnitude of the supply voltage; and by enabling the PWM control signals for the motor output stages determined by the control unit on the basis of the specified setpoint to be forwarded unchanged to the output stages until the motor nominal voltage is reached, with their pulse width being reduced according to the setting provided by the correction unit only when the supply voltage begins to increase.

The correction unit may be integrated into the control unit. In this case, the control unit delivers, to the motor end stages, the PWM control signals, either unchanged or with a reduced pulse width, as a function of the magnitude of the supply voltage.

With this protective circuit, it is possible to detect the motor speed instead of the supply voltage and use it to reduce the pulse width of the PWM control signals. According to the present invention, both values—the supply voltage and the speed—are used to reduce the pulse width of the PWM control signals.

DETAILED DESCIPTION

Figure 1:
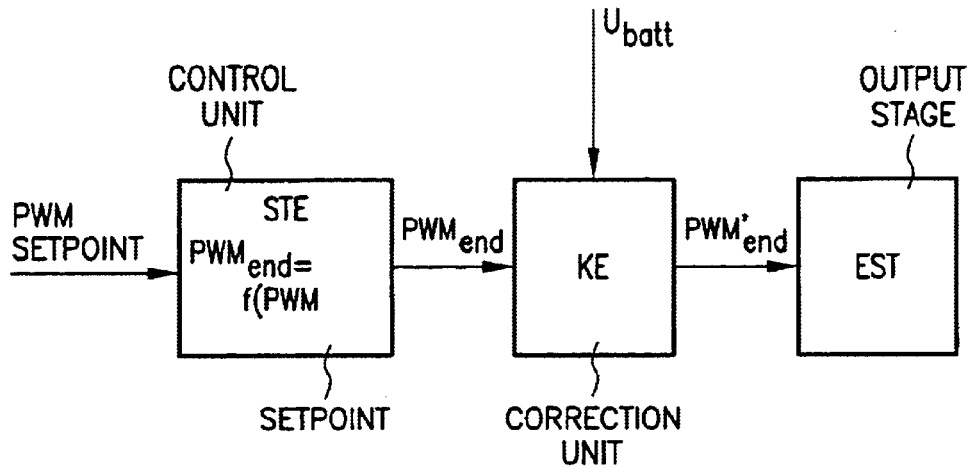
FIG. 1 shows a block diagram of the control unit of an electronically commutable motor with a reduction in the pulse width of the PWM control signals.

FIG. 1 shows a schematic representation of the main units of the electronically commutable motor according to the present invention. However, this does not represent a design delimitation, but serves merely to explain the functions.

Control unit STE is provided with a setpoint $PWM_{setpoint}$ for the PWM control signals of the motor. The setpoint may be specified manually, for example using a potentiometer, and serves to specify a higher or lower speed for the fan driven by the motor. The motor characteristic, indicated by function $PWM_{end}=f(PWM_{setpoint})$, is stored in control unit STE, where $PWM_{end}$ represents the PWM control signal for output stages EST of the motor and specifies pulse width ID of the control signal according to FIG. 3.

Figure 2:
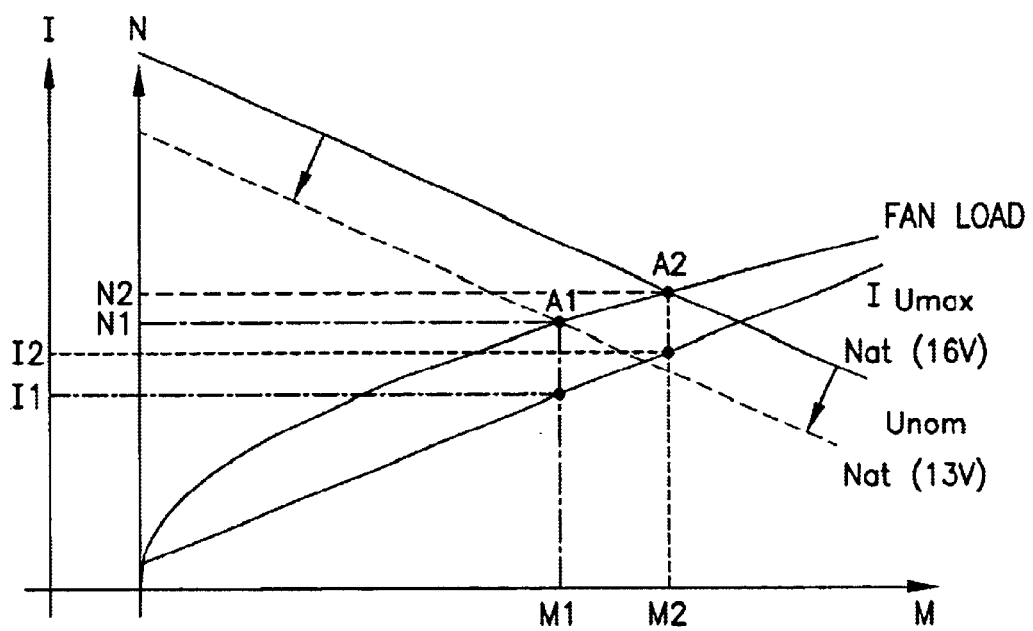
FIG. 2 shows the motor characteristics with power limiting.
Figure 3:
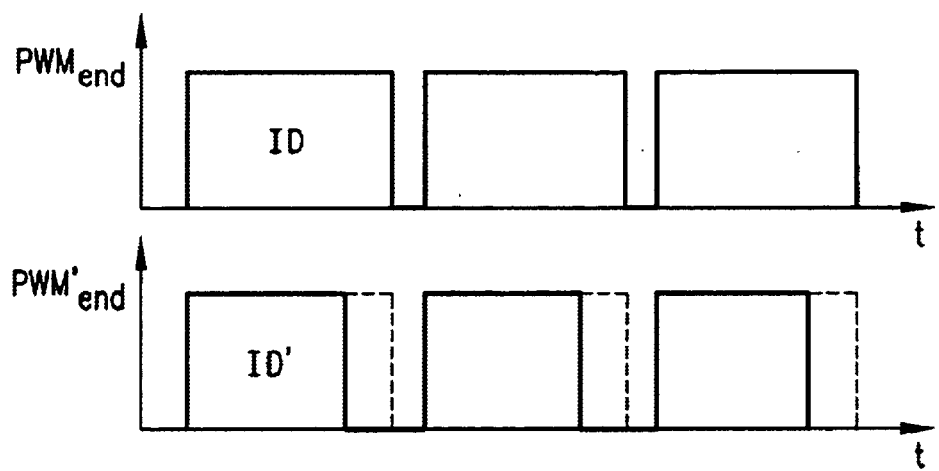
FIG. 3 shows the PWM control signal with a normal and reduced pulse width.
Figure 4:
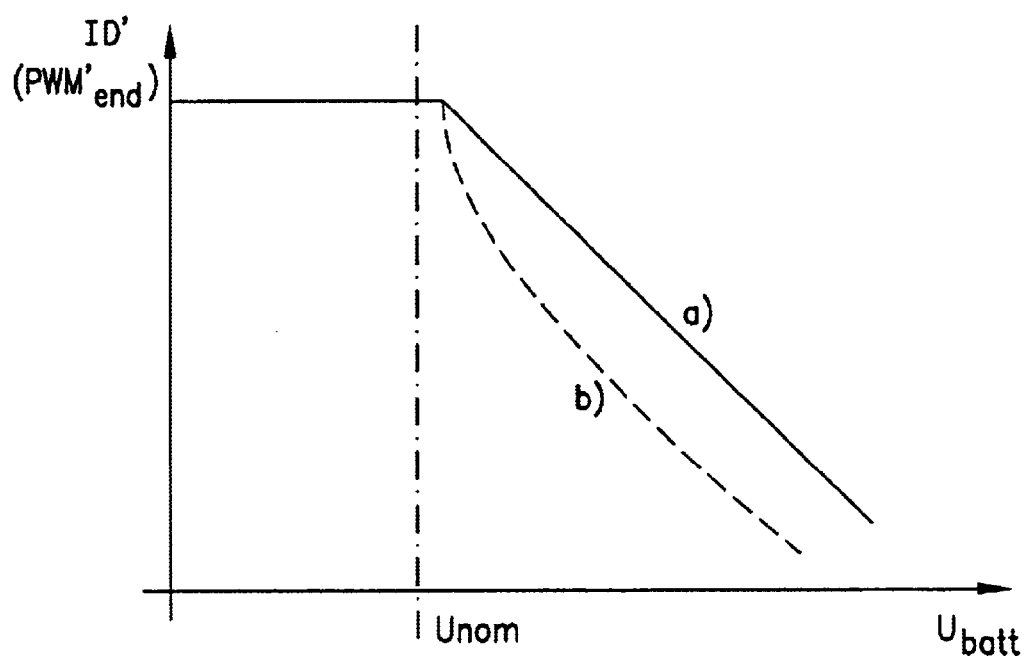
FIG. 4 shows the pulse width variation as a function of the supply voltage.

As shown in FIG. 2, this yields different motor characteristics I–f (M) and N=f (M) for nominal voltage $U_{nom}$=13 V and maximum supply voltage $U_{max}$=16 V, where I=current, M=torque, and N=speed. Maximum working point A1 having maximum speed N1, maximum current I1 and maximum torque M1 is specified as the load limit value at nominal voltage $U_{nom}$. An increase in the supply voltage to maximum value $U_{max}$ would yield a maximum working point A2 having maximum current I2, maximum speed N2 and maximum torque M2. To avoid having to design the motor and its electronic components for these maximum loads, activation of output stages EST of the motor is corrected, as indicated by correction unit KE in FIG. 1. Value $PWM_{end}$ for the PWM signal of output stages EST determined by control unit STE for setpoint $PWM_{setpoint}$ is modified by correction unit KE so that working point A2 returns to working point A1:

This takes place as a function of the magnitude of supply voltage $U_{batt}$, as indicated by PWM control signal $PWM'_{end}$ output by correction unit KE. As shown in FIG. 3, pulse width ID is reduced to pulse width ID' in linear (a) or nonlinear (b) proportion to the further rise in supply voltage $U_{batt}$, more or less shortly after nominal voltage $U_{nom}$ is exceeded, as shown in FIG. 4.

Figure 5:
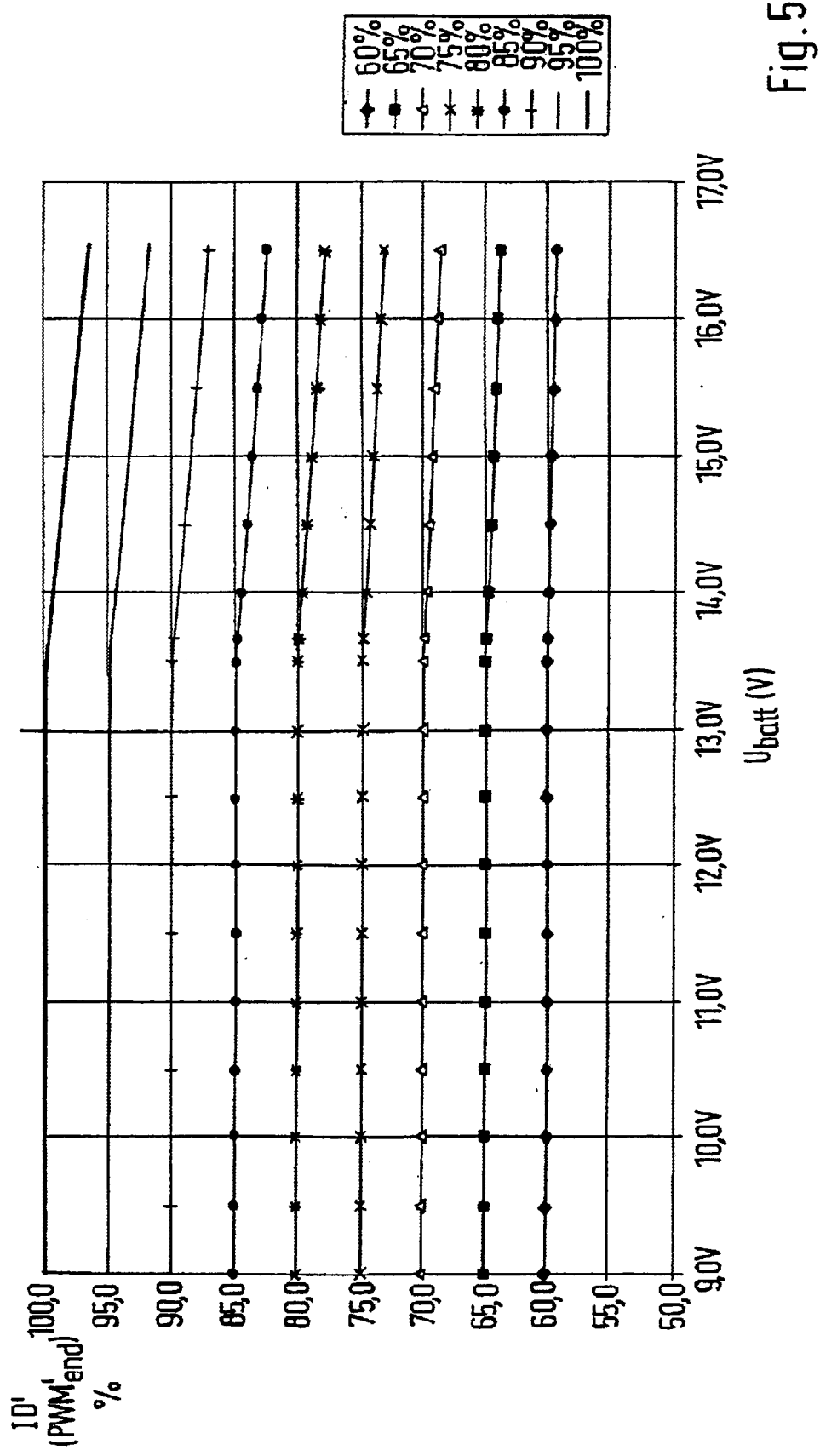
FIG. 5 shows the pulse width variation as a function of the supply voltage with different specified setpoints for the PWM control signals.

The degree of reduction may also vary in conjunction with specified setpoint $PWM_{setpoint}$, as shown in FIG. 5. With a small setpoint $PWM_{setpoint}$, the reduction decreases more gradually than with a larger setpoint, as indicated in FIG. 5 by the different curves of reduced pulse widths ID' of PWM control signals $PWM'_{end}$ as a function of supply voltage $U_{batt}$.

Note, in addition, that pulse width ID may be corrected by control unit STE itself, and speed N may be used instead of supply voltage $U_{batt}$ and/or in addition to supply voltage $U_{batt}$ as the parameter for reducing pulse width ID.

What is claimed is:

1. An electronically commutable motor comprising:

output stages feedable from a supply voltage source; and an electronic control unit for controlling the output stages using operating PWM control signals, a pulse width of the control signals being reducible as a function of a magnitude of a supply voltage and a specified setpoint such that the motor is protected against overloading, the control signals being determined by a specified operating setpoint up to a nominal voltage of the supply voltage, the pulse width of the control signals being reducible in linear or nonlinear proportion to an increasing supply voltage only upon exceeding the nominal voltage.

2. The motor according to claim 1, wherein the pulse width is reduced at an increasing rate in proportion to an increasing specified setpoint and an increasing supply voltage.

3. The motor according to claim 2, further comprising a correction unit assigned to the control unit that delivers to the output stages the control signals determined according to the specified setpoint as a function of the magnitude of the supply voltage.

4. The motor according to claim 3, wherein the control signals are delivered unchanged to the output stages until reaching the nominal voltage, the pulse width being reduced according to a setting provided by the correction unit only when the supply voltage begins to increase.

5. The motor according to claim 3, wherein the correction unit is integrated into the control unit, which delivers the control signals to the output stages as a function of the magnitude of the supply voltage.

6. The motor according to claim 2, wherein the reduction of the pulse width of the control signals takes place as a function of a speed of the motor.

7. The motor according to claim 1, further comprising a correction unit assigned to the control unit that delivers, to the output stages, the control signals determined according to the specified setpoint, either unchanged or as reduced control signals, as a function of the magnitude of the supply voltage.

8. The motor according to claim 7, wherein the control signals, are delivered unchanged to the output stages until reaching the nominal voltage, the pulse width being reduced according to a setting provided by the correction unit only when the supply voltage begins to increase.

9. The motor according to claim 7, wherein the correction unit is integrated into the control unit, which delivers the control signals to the output stages, either unchanged or with a reduced pulse width, as a function of the magnitude of the supply voltage.

10. The motor according to claim 1, wherein the reduction of the pulse width of the control signals takes place as a function of a speed of the motor.

11. The motor according to claim 1, wherein the electronic control unit outputs the PWM controls signals to the output stages.

12. The motor according to claim 1, wherein the pulse width of the control signals is reducible in linear proportion.

13. The motor according to claim 12, wherein the electronic control unit outputs the PWM controls signals to the output stages.

14. The motor according to claim 1, wherein the pulse width of the control signals is reducible in nonlinear proportion.

15. The motor according to claim 14, wherein the electronic control unit outputs the PWM controls signals to the output stages.

* * * * *